US012669389B2

(12) United States Patent
Lin et al.

(10) Patent No.: US 12,669,389 B2
(45) Date of Patent: Jun. 30, 2026

(54) LOAD CELL WITH ROBERVAL STRUCTURE HAVING ANTI-OFFSET FUNCTION, AND WEIGHING DEVICE

(71) Applicants: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Hongzhi Lin, Changzhou (CN); Lei Xu, Changzhou (CN); Li Yang, Changzhou (CN)

(73) Assignees: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 429 days.

(21) Appl. No.: 18/034,975

(22) PCT Filed: Dec. 21, 2021

(86) PCT No.: PCT/CN2021/139956

§ 371 (c)(1),
(2) Date: May 2, 2023

(87) PCT Pub. No.: WO2022/096028

PCT Pub. Date: May 12, 2022

(65) Prior Publication Data

US 2024/0003761 A1      Jan. 4, 2024

(30) Foreign Application Priority Data

Nov. 5, 2020    (CN) .......................... 202011224983.9

(51) Int. Cl.
| | |
|---|---|
| *G01L 1/22* | (2006.01) |
| *G01G 3/14* | (2006.01) |
| *G01G 21/24* | (2006.01) |

(52) U.S. Cl.
CPC .......... *G01L 1/2243* (2013.01); *G01G 3/1414* (2013.01); *G01G 21/244* (2013.01)

(58) Field of Classification Search
CPC ... G01G 21/244; G01G 3/1414; G01L 1/2243
See application file for complete search history.

(56) References Cited

U.S. PATENT DOCUMENTS

| | | | | | |
|---|---|---|---|---|---|
| 4,450,922 | A | * | 5/1984 | Alexandre | ............ G01L 1/2243 |
| | | | | | 73/862.633 |
| 5,220,971 | A | * | 6/1993 | Farr | ...................... G01L 1/2262 |
| | | | | | 177/229 |

(Continued)

FOREIGN PATENT DOCUMENTS

| | | | | |
|---|---|---|---|---|
| EP | | 153121 A | * | 8/1985 |
| JP | | 2005-331459 A | | 12/2005 |

OTHER PUBLICATIONS

Machine translation of JP2005331459.*

*Primary Examiner* — Natalie Huls
(74) *Attorney, Agent, or Firm* — Standley Law Group LLP; Jeffrey S. Standley; Adam J. Smith

(57)    ABSTRACT

A load cell with a Roberval structure having an anti-offset function, and a weighing device are disclosed. The load cell includes strain detection elements mounted on an elastic element, which includes a loading portion for receiving a load from a connector, a fixing portion for fixing the elastic element, a strain generation portion for converting the load into deformation, and a parallel guide beam for transferring the load and keeping the loading portion translational when loaded. The strain generation portion includes at least one hollow cavity body. The loading portion and the fixing (Continued)

portion are respectively located on left and right sides of the strain generation portion. The parallel guide beam is located at upper and lower portions of the strain generation portion. A center of rotation and a geometric center of the strain generation portion coincide when the load cell with the Roberval structure is loaded.

2 Claims, 7 Drawing Sheets

(56) References Cited

U.S. PATENT DOCUMENTS

| | | | | |
|---|---|---|---|---|
| 5,293,007 | A | * | 3/1994 | Darst .................... G01L 1/2243 |
| | | | | 73/1.13 |
| 7,334,487 | B2 | | 2/2008 | Tsutaya et al. |
| 2003/0111277 | A1 | * | 6/2003 | Aumard ............... G01G 3/1412 |
| | | | | 177/229 |
| 2005/0132820 | A1 | * | 6/2005 | Eilersen ................... G01G 3/12 |
| | | | | 73/862.625 |
| 2009/0283337 | A1 | * | 11/2009 | Haefeli .................. G01G 21/30 |
| | | | | 177/180 |
| 2010/0148916 | A1 | * | 6/2010 | Tajiri .................... G01L 1/2243 |
| | | | | 338/2 |
| 2016/0047702 | A1 | * | 2/2016 | Bodmer .................... G01L 1/26 |
| | | | | 408/1 R |

* cited by examiner

LOAD CELL WITH ROBERVAL STRUCTURE HAVING ANTI-OFFSET FUNCTION, AND WEIGHING DEVICE

BACKGROUND OF THE INVENTION

Technical Field

The present invention relates to the field of load cells, and in particular to a load cell with a Roberval structure having an anti-offset function, and a weighing device.

Background Art

It is well known that a Roberval structure is widely applied to the field of load cells due to a simple and compact mechanical structure and good mechanical properties thereof. When an object to be weighed is placed at the centre of a load cell for measurement, the load cell has a good metering performance.

However, when the position of the object to be weighed changes, it is found that an output of the load cell changes accordingly, and this change is commonly referred to as an offset error or angular error.

It is found after study that the offset error is mainly composed of two parts: a linear offset error and a non-linear offset error. As for the linear offset error, the prior art is mainly to compensate the linear offset error by changing the thickness of a strain generation region by means of mechanical grinding or laser ablation. However, for the non-linear offset error, there is no way to solve this problem in the prior art.

The non-linear offset error is smaller than the linear offset error. However, with the increasing precision requirements of the weighing device, the requirements on the offset error of the load cell are also improved accordingly. Currently, the non-linear offset error is inevitable, and even if we can perfectly compensate the linear offset error, the weighing device is likely to fail in performance due to the non-linear offset error that cannot be compensated.

In view of this, a person skilled in the art has developed a load cell with a Roberval structure having an anti-offset function in order to overcome the above technical problems.

SUMMARY

In order to overcome the defects, namely the technical problems to be solved, in the prior art that an offset error of a load cell cannot be neglected and that the offset error likely leads to an unqualified performance, etc., the present invention provides a load cell with a Roberval structure having an anti-offset function, and a weighing device.

The present invention solves the above technical problems by means of the following technical solution:
the present invention provides a load cell with a Roberval structure having an anti-offset function, which is characterized in that the load cell comprises: an elastic element for bearing a load and a plurality of strain detection elements for detecting deformation, the strain detection elements being mounted on the elastic element;
the elastic element comprises: a loading portion for receiving a load from a connector, a fixing portion for fixing the elastic element, a strain generation portion for converting the load into deformation, and a parallel guide beam for transferring the load and keeping the loading portion translational when loaded;

the strain generation portion is composed of at least one hollow cavity body, the loading portion and the fixing portion are respectively located on left and right sides of the strain generation portion, and the parallel guide beam is located at upper and lower portions of the strain generation portion; and
the centre of rotation and the geometric centre of the strain generation portion coincide when the load cell with the Roberval structure is loaded.

According to an embodiment of the present invention, the strain generation portion is a hollow cavity body, the strain generation portion is in an "H" shape, and the strain detection elements are respectively mounted on upper and lower end faces of the parallel guide beam and respectively correspond to positions of the upper and lower portions of the strain generation portion.

According to an embodiment of the present invention, the upper portion of the strain generation portion is parallelly biased towards the fixing portion or the lower portion of the strain generation portion is parallelly biased towards the loading portion.

According to an embodiment of the present invention, the upper portion of the strain generation portion is parallelly biased towards the loading portion or the lower portion of the strain generation portion is parallelly biased towards the fixing portion.

According to an embodiment of the present invention, the strain generation portion comprises three hollow cavity bodies, wherein one cavity body is a first strain generation portion, the other two cavity bodies are second strain generation portions, the first strain generation portion is disposed in the middle of the elastic element, and the second strain generation portions are respectively disposed on upper and lower sides of the first strain generation portion.

According to an embodiment of the present invention, the first strain generation portion is petaloid, and the second strain generation portion is in the shape of the Chinese character " 凹 "; and
the strain detection elements are respectively arranged inside the second strain generation portions, and respectively correspond to the positions of the upper and lower portions of the first strain generation portion.

According to an embodiment of the present invention, the first strain generation portion is circular, the second strain generation portion is in the shape of the Chinese character " 凹 " and the bottom of the second strain generation portion matches an outer surface of the first strain generation portion in shape; and
the strain detection elements are respectively arranged inside the first strain generation portion and surround the first strain generation portion.

According to an embodiment of the present invention, the first strain generation portion is square or rectangular, the second strain generation portion is in the shape of the Chinese character " 凹 ", a the bottom of the second strain generation portion matches an outer surface of the first strain generation portion in shape; and
the strain detection elements are respectively arranged inside the first strain generation portion.

According to an embodiment of the present invention, the strain generation portion comprises two hollow cavity bodies, the two cavity bodies are third strain generation portions symmetrically distributed vertically, the strain detection elements are respectively disposed inside the third strain generation portions, and the strain detection elements correspond to each other vertically.

According to an embodiment of the present invention, the third strain generation portion is in the shape of the Chinese character "凹".

The present invention further provides a weighing device, which is characterized in that the weighing device comprises a load cell with a Roberval structure having an anti-offset function as described above.

The positive and advanced effects of the present invention are as follows:

the load cell with the Roberval structure having the anti-offset function and the weighing device of the present invention can effectively compensate a non-linear offset error. By adjusting the stiffness of upper and lower beams of the elastic element, the centre of rotation and the geometry coincide after the centre of the load cell with the Roberval structure is loaded, so that the non-linear offset error is compensated from the aspect of mechanical structure design.

BRIEF DESCRIPTION OF THE DRAWINGS

The above and other features, properties and advantages of the present invention will become clearer based on the description below in conjunction with the accompanying drawings and embodiments, and the same features are denoted by the same reference numerals throughout the figures, in which.

DETAILED DESCRIPTION OF EMBODIMENTS

Figure 1:
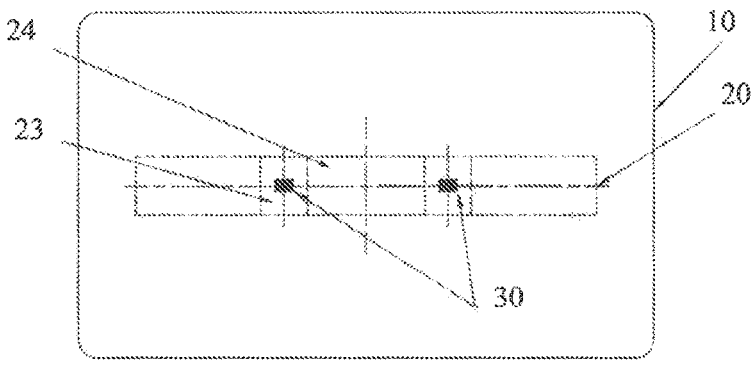
FIG. 1 is a schematic structural diagram of a weighing device according to the present invention.

To make the above objectives, features, and advantages of the present invention more apparent and easier to understand, specific implementations of the present invention will be described in detail below in conjunction with the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the accompanying drawings denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the present invention must be understood, not simply by the actual terms used but also by the meanings encompassed by each term.

FIG. 1 is a schematic structural diagram of a weighing device according to the present invention.

As shown in FIG. 1, a load cell with a Roberval structure having an anti-offset function of the present invention is mainly applied to a weighing device, which weighing device may be a platform scale, a price computing scale, etc., and a structure of the weighing device mainly comprises a scale pan 10 for placing an object to be weighed, a connector for transferring a load of the object to be weighed to the load cell, and the load cell with the Roberval structure for detecting a weight of the object to be weighed.

Figure 2:
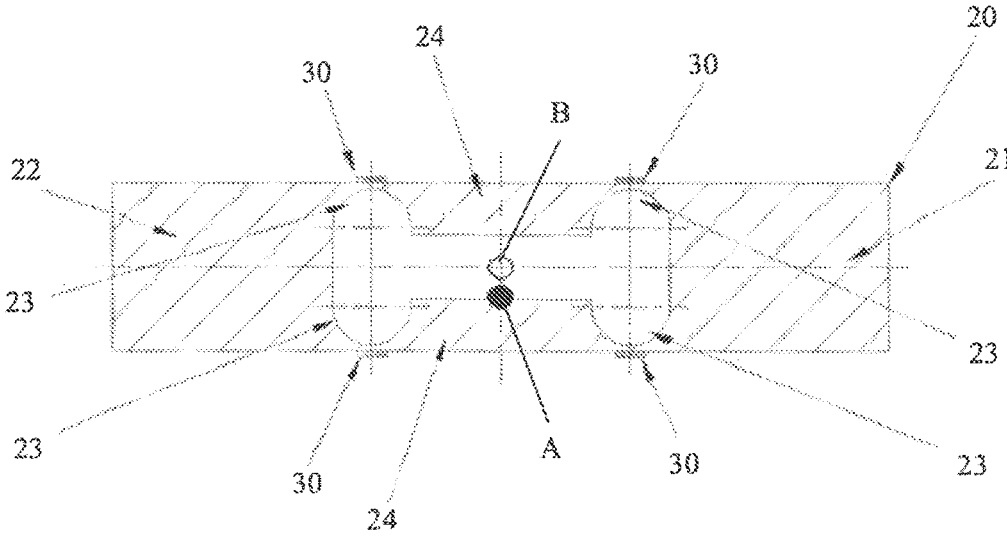
FIG. 2 is a schematic structural diagram of a typical load cell with a Roberval structure.

FIG. 2 is a schematic structural diagram of a typical load cell with a Roberval structure.

As shown in FIG. 2, the typical load cell with the Roberval structure comprises an elastic element 20 for bearing a load and a strain detection element 30 for detecting deformation. According to the effect, the elastic element 20 may comprise: a loading portion 21 for receiving the load from the connector, a fixing portion 22 for fixing the elastic element, a strain generation portion 23 for converting the load into deformation, a parallel guide beam 24 for transferring the load and keeping the loading portion translational when loaded, and a strain detection element 30 for detecting deformation.

The strain detection element is arranged on a surface of the strain generation portion and used for converting deformation of the strain generation portion into a resistance change of the strain detection element. A plurality of strain detection elements form a Wheatstone bridge, which is used for converting the resistance change of the strain detection elements into an electrical signal output of a bridge circuit.

In general, there are two special points on an elastic element having a Roberval structure, namely, a centre of rotation A and a geometric centre B. The centre of rotation A is characterized in that the structure rotates about the centre of rotation A when rotating, and the position of the centre of rotation A does not change in this process. When the centre of rotation A is above the geometric centre B, the geometric centre B will rotate up about the centre of rotation A after the elastic element 20 is biased, which is equivalent to applying an additional opposite force or deformation in a direction of normal loading deformation of the load cell, and an output of the load cell will decrease at this moment. In contrast, when the centre of rotation A is below the geometric centre B, the geometric centre B will rotate down about the centre of rotation A after the elastic element 20 is biased, which is equivalent to superimposing an additional force or deformation in the direction of normal loading deformation of the load cell, and the output of the load cell will increase at this moment.

When the elastic element deformed after the centre of the load cell with the Roberval structure is loaded is ideally symmetrical, namely, upper and lower beams have the same stiffness, then the centre of rotation A and the geometric centre A are coincident at this moment. When the load cell is biased, the geometric centre B of the elastic element does not change with changes in eccentric load and position, which is manifested as that the output of the load cell is insensitive to the offset. Conversely, when the centre of rotation A and the geometric centre B do not coincide, the geometric centre B of the elastic element 20 will change, after the load cell is biased, with the changes in eccentric load and position, thus affecting the output of the load cell and causing a non-linear offset error.

The elastic element 20 of the typical load cell with the Roberval structure can be designed, when in an unloaded state, to ensure structural symmetry, in which case the centre of rotation A and the geometric centre B in the elastic element 20 are coincident.

When the object to be weighed is placed on the scale pan 10 of the weighing device, the weight of the object to be weighed is converted, by means of the connector, into a load to be transferred onto the elastic element 20, such that the loading portion 21 generates a translational motion, the parallel guide beam 24 rotates, and the strain generation portion 23 generates corresponding deformation. The structure of the elastic element 20 is not symmetrical at this moment, and accordingly the centre of rotation A and the geometric centre B in the elastic element 20 also do not coincide.

When the object to be weighed is placed away from the centre of the scale pan 10, the elastic element 20 is subjected to an additional torque such that the geometric centre B rotates about the centre of rotation A. This causes the elastic element 20 to generate additional deflection, and causes the strain generation portion 23 to generate additional deformation, resulting in a change in the output of the load cell, namely, a source of the non-linear offset error.

Therefore, the main reason for the non-linear offset error is that the centre of rotation A and the geometric centre B do not coincide due to structural stiffness mismatch of the upper and lower beams after the elastic element 20 deforms.

Based on this, in order to compensate the non-linear offset error, the structural stiffness of the upper and lower beams of the elastic element 20 is adjusted through a reasonable structural design in the present invention, such that structural stiffness match of the upper and lower beams after the elastic element 20 deforms ensures that the centre of rotation and the geometric centre remain coincident.

Embodiment 1

Figure 3:
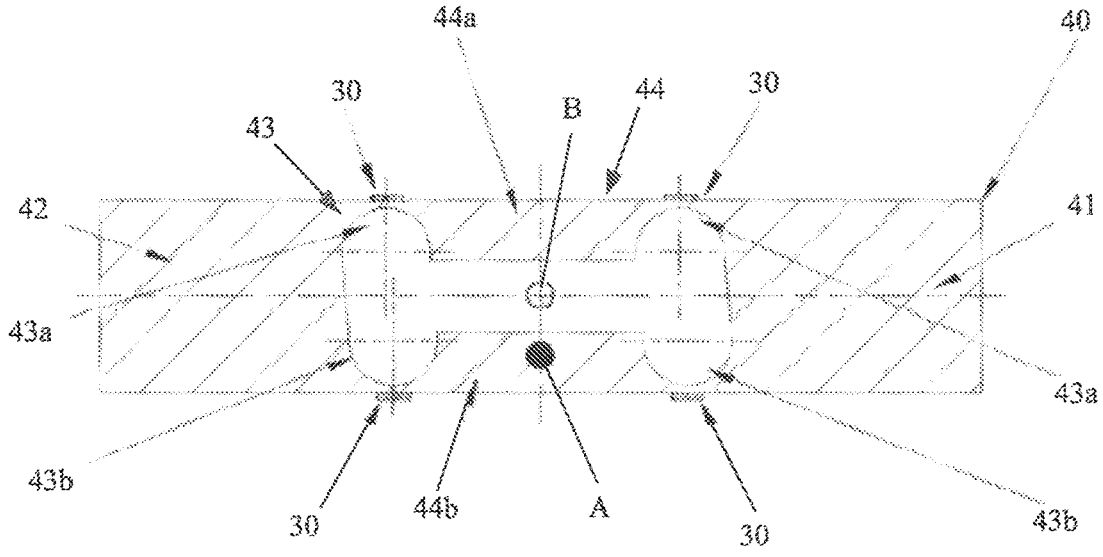
FIG. 3 is a schematic structural diagram of Embodiment 1 of a load cell with a Roberval structure having an anti-offset function according to the present invention.

FIG. 3 is a schematic structural diagram of Embodiment 1 of a load cell with a Roberval structure having an anti-offset function according to the present invention.

As shown in FIG. 3, the present invention provides a load cell with a Roberval structure having an anti-offset function, the load cell comprising: an elastic element 40 for bearing a load and a plurality of strain detection elements 30 for detecting deformation, the strain detection elements 30 being mounted on the elastic element 40. The elastic element 40 comprises: a loading portion 41, a fixing portion 42, a strain generation portion 43 and a parallel guide beam 44, wherein the loading portion 41 is used for receiving a load from a connector, the fixing portion 42 is used for fixing the elastic element 40, the strain generation portion 43 is used for converting the load into deformation, and the parallel guide beam 44 is used for transferring the load and keeping the loading portion 41 translational when loaded.

The strain generation portion 43 is composed of at least one hollow cavity body, the loading portion 41 and the fixing portion 42 are respectively located on left and right sides of the strain generation portion 43, and the parallel guide beam 44 is located at upper and lower portions of the strain generation portion 43.

The centre of rotation A and the geometric centre B of the strain generation portion 43 coincide when the load cell with a Roberval structure is loaded.

Preferably, in this embodiment, the strain generation portion 43 is a hollow cavity body, the strain generation portion 43 is in an "H" shape; and the strain detection elements 30 are respectively mounted on upper and lower end faces of the parallel guide beam 44, located on an upper beam 44a and a lower beam 44b of the parallel guide beam, and respectively correspond to positions of an upper portion 43a and a lower portion 43b of the strain generation portion 43. The upper portion 43a of the strain generation portion 43 is parallelly biased towards the fixing portion 42.

On the basis of the typical load cell with the Roberval structure, the stiffness of the upper and lower beams of the elastic element 20 can be adjusted by translating the position of the strain generation portion 43. By translating the upper portion 43a of the strain generation portion of the upper beam 44a towards the fixing portion 42, the stiffness of the upper beam is reduced, namely, the deformation of the upper beam is increased under the same load.

Similarly, at the lower beam 44b of the parallel guide beam 44, the lower portion 43b of the strain generation portion 43 is translated towards the loading portion 41, such that a non-linear offset error is compensated in a "positive" direction.

Figure 4:
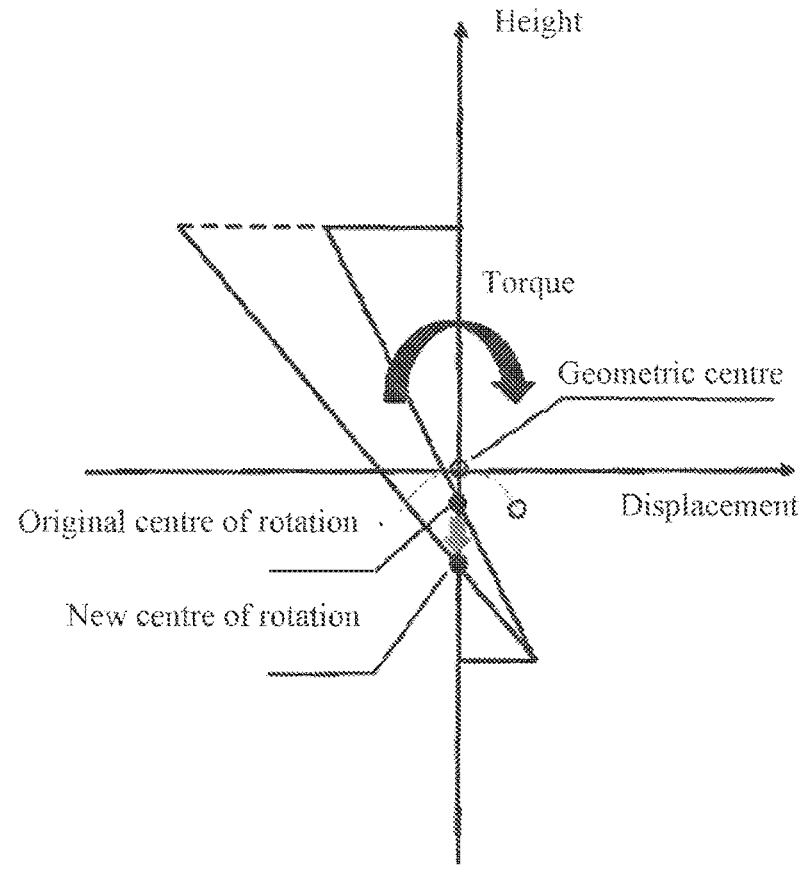
FIG. 4 is a schematic diagram showing the effect of the centre of rotation offset on the geometric centre of the load cell with the Roberval structure having the anti-offset function according to the present invention.

FIG. 4 is a schematic diagram showing the effect of the centre of rotation offset on the geometric centre of the load cell with the Roberval structure having the anti-offset function according to the present invention.

As shown in FIG. 4, when the deformation of the upper beam 44a of the parallel guide beam 44 increases while the deformation of the lower beam 44b does not change, the centre of rotation A of the elastic element 20 is biased downwards, namely, in a direction where the stiffness is large. When the elastic element 20 is biased, the geometric centre B will rotate down about the centre of rotation A, which is equivalent to superimposing an additional force or deformation in a direction of normal loading deformation of the load cell. The output of the load cell will increase at this moment, causing the non-linear offset error to be compensated in the "positive" direction.

Embodiment 2

Figure 5:
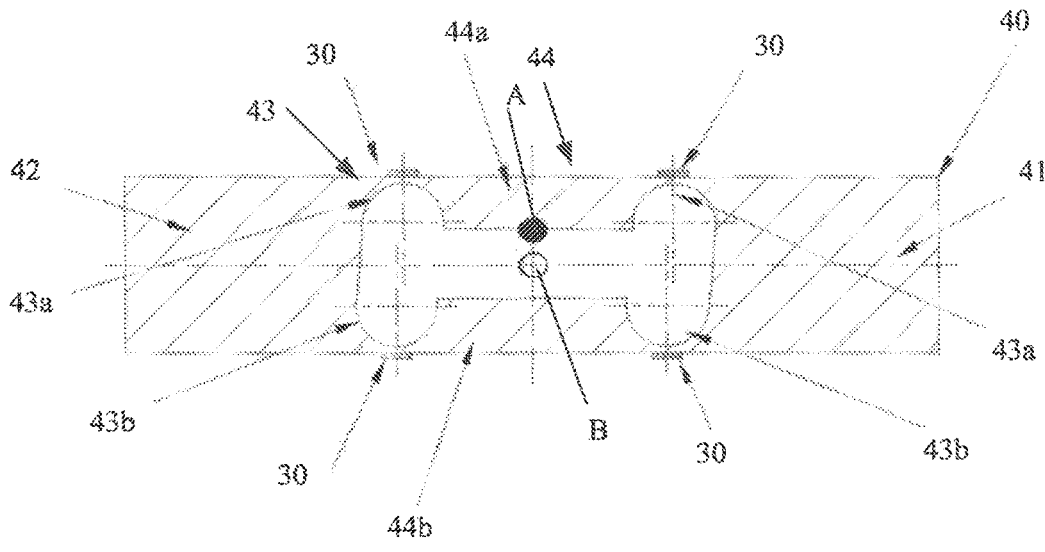
FIG. 5 is a schematic structural diagram of Embodiment 2 of the load cell with the Roberval structure having the anti-offset function according to the present invention.

FIG. 5 is a schematic structural diagram of Embodiment 2 of the load cell with the Roberval structure having the anti-offset function according to the present invention.

As shown in FIG. 5, the present invention provides a load cell with a Roberval structure having an anti-offset function, the load cell comprising: an elastic element 40 for bearing a load and a plurality of strain detection elements 30 for detecting deformation, the strain detection elements 30 being mounted on the elastic element 40. The elastic element 40 comprises: a loading portion 41, a fixing portion 42, a strain generation portion 43 and a parallel guide beam 44, wherein the loading portion 41 is used for receiving a load from a connector, the fixing portion 42 is used for fixing the elastic element 40, the strain generation portion 43 is used for converting the load into deformation, and the parallel guide beam 44 is used for transferring the load and keeping the loading portion 41 translational when loaded.

The strain generation portion 43 is composed of at least one hollow cavity body, the loading portion 41 and the fixing portion 42 are respectively located on left and right sides of the strain generation portion 43, and the parallel guide beam 44 is located at upper and lower portions of the strain generation portion 43. The centre of rotation A and the geometric centre B of the strain generation portion 43 coincide when the load cell with a Roberval structure is loaded. Preferably, in this embodiment, the strain generation portion 43 is a hollow cavity body, the strain generation portion 43 is in an "H" shape; and the strain detection elements 30 are respectively mounted on upper and lower end faces of the parallel guide beam 44, located on an upper beam 44a and a lower beam 44b of the parallel guide beam, and respectively correspond to positions of an upper portion 43a and a lower portion 43b of the strain generation portion 43. The upper portion 43a of the strain generation portion 43 is parallelly biased towards the loading portion 41.

At the upper beam 44a of the parallel guide beam 44, the upper portion 43a of the strain generation portion 43 is translated towards the loading portion 41, improving the stiffness of the upper beam, namely, decreasing the deformation of the upper beam 44a under the same load. When the deformation of the upper beam 44a decreases while the deformation of the lower beam 44b does not change, the centre of rotation A of the elastic element 40 is biased upwards, namely, in a direction where the stiffness is large. When the elastic element 40 is biased, the geometric centre B will rotate up about the centre of rotation A, which is equivalent to superimposing an additional force or deformation in a direction of normal loading deformation of the load cell, and the output of the load cell will decrease at this moment, thereby compensating the non-linear offset error in a "negative" direction.

Similarly, it is also possible to translate, at the lower beam 44b, the strain generation portion of the lower portion 43b of the strain generation portion 43 towards the fixing portion 42 such that the non-linear offset error is compensated in the "negative" direction.

Figure 6:
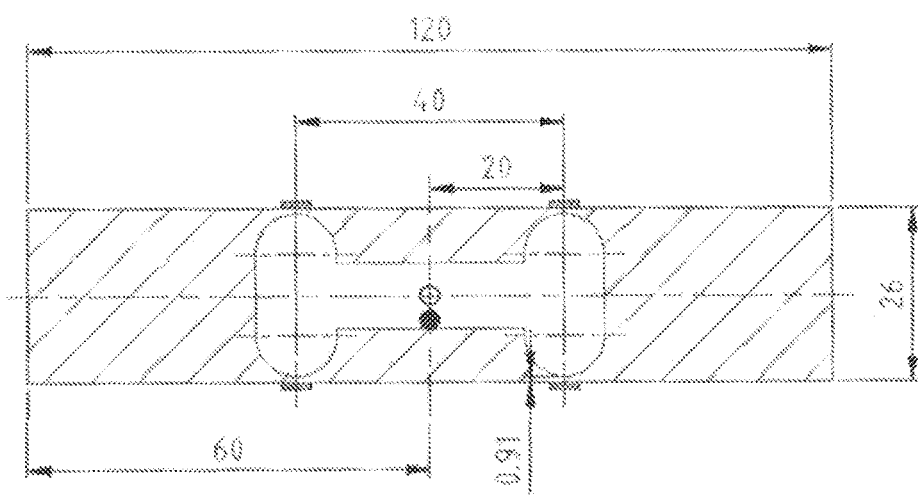
FIG. 6 is a schematic diagram showing a structural dimension of the typical load cell with the Roberval structure in the prior art.

Based on the above structure, with regard to the structure of the load cell with the Roberval structure, it is further explained in combination with a more specific structural dimension:

FIG. 6 is a schematic diagram showing a structural dimension of the typical load cell with the Roberval structure in the prior art.

As shown in FIG. 6, in an uncompensated load cell with the Roberval structure, for example, a length of the load cell is 120 mm, a centre-to-centre distance of the strain generation portion is 40 mm, and a thickness of the strain generation portion is 0.91 mm. When an eccentric distance of a 1.5 kg object to be weighed is 60 mm, an initial non-linear offset of the load cell with the Roberval structure can reach +0.015 g. For a weighter with the display accuracy of 150,000 d, an eccentricity error reaches +1.5 d or +0.030 d/mm.

Figure 7:
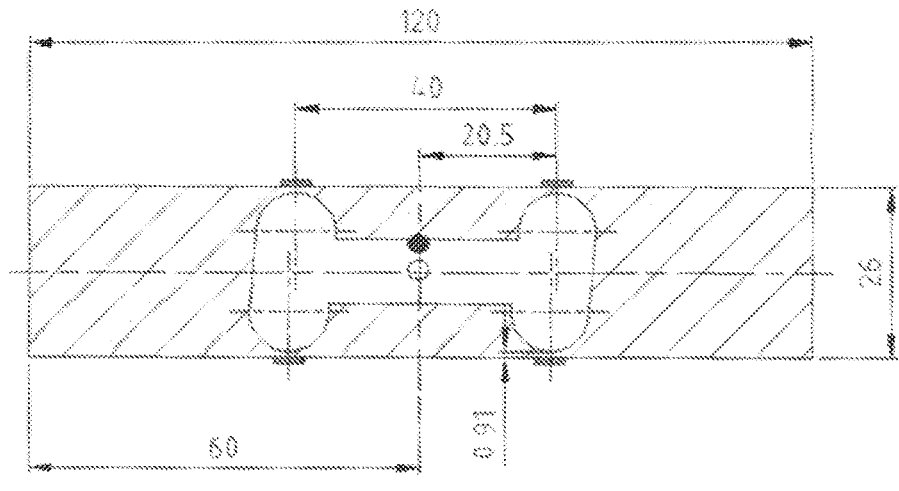
FIG. 7 is a schematic diagram showing the structural dimension of Embodiment 2 of the load cell with the Roberval structure having the anti-offset function according to the present invention.

FIG. 7 is a schematic diagram showing the structural dimension of Embodiment 2 of the load cell with the Roberval structure having the anti-offset function according to the present invention.

As shown in FIG. 7, the load cell with the Roberval structure of the technical solution of the present application is used accordingly, and an overall dimension of the load cell remains unchanged. After analytical calculation, for the designed load cell with the Roberval structure, the compensation amount of an offset strain gage generation portion for the non-linear offset error is about 0.03 g/mm.

If the initial non-linear offset error of the designed load cell is fully compensated, the upper portion of the strain generation portion needs to be simultaneously biased by 0.5 mm towards the loading portion, or the lower portion of the strain gage generation portion needs to be simultaneously biased by 0.5 mm towards the fixing portion. Considering a machining error, the non-linear offset error of the compensated load cell can reach 0.001 g or 0.1 d.

Embodiment 3

Figure 8:
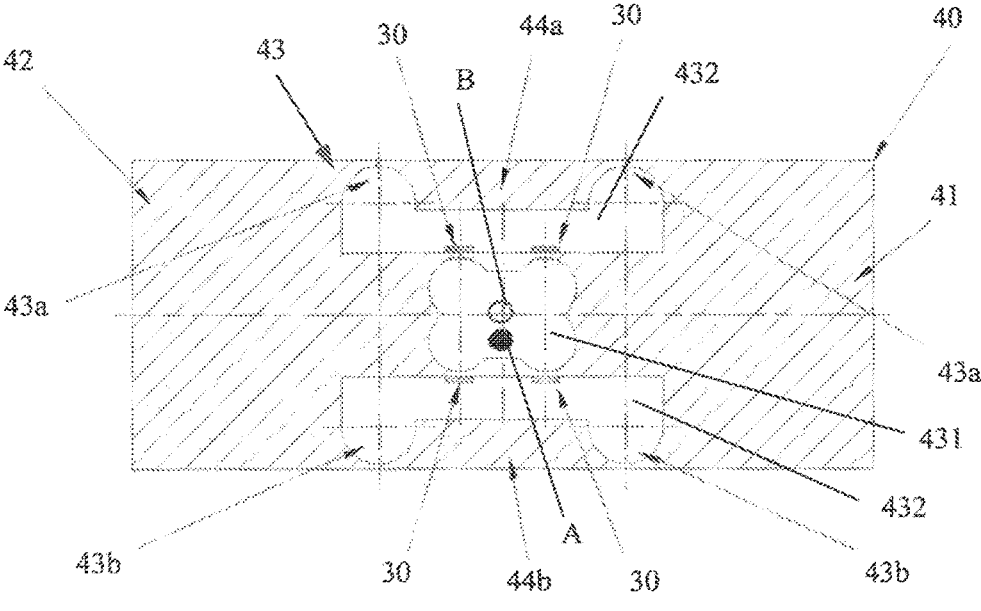
FIG. 8 is a schematic structural diagram of Embodiment 3 of the load cell with the Roberval structure having the anti-offset function according to the present invention.

FIG. 8 is a schematic structural diagram of Embodiment 3 of the load cell with the Roberval structure having the anti-offset function according to the present invention.

As shown in FIG. 8, the present invention discloses a load cell with a Roberval structure having an anti-offset function, the load cell comprising: an elastic element 40 for bearing a load and a plurality of strain detection elements 30 for detecting deformation, the strain detection elements 30 being mounted on the elastic element 40. The elastic element 40 comprises: a loading portion 41, a fixing portion 42, a strain generation portion 43 and a parallel guide beam 44, wherein the loading portion 41 is used for receiving a load from a connector, the fixing portion 42 is used for fixing the elastic element 40, the strain generation portion 43 is used for converting the load into deformation, and the parallel guide beam 44 is used for transferring the load and keeping the loading portion 41 translational when loaded.

The strain generation portion 43 is composed of at least one hollow cavity body, the loading portion 41 and the fixing portion 42 are respectively located on left and right sides of the strain generation portion 43, and the parallel guide beam 44 is located at upper and lower portions of the strain generation portion 43. The centre of rotation A and the geometric centre B of the strain generation portion 43 coincide when the load cell with a Roberval structure is loaded. Preferably, in this embodiment, the strain generation portion 43 comprises three hollow cavity bodies, wherein one cavity body is a first strain generation portion 431, the other two cavity bodies are second strain generation portions 432, the first strain generation portion 431 is disposed in the middle of the elastic element 40, and the second strain generation portions 432 are respectively disposed on upper and lower sides of the first strain generation portion 431.

Further, the first strain generation portion 431 is preferably petaloid, and the second strain generation portions 432 are preferably in the shape of the Chinese character "a". The strain detection elements 30 are respectively arranged inside the second strain generation portions 432, and respectively correspond to the positions of the upper and lower portions of the first strain generation portion 431.

Embodiment 4

Figure 9:
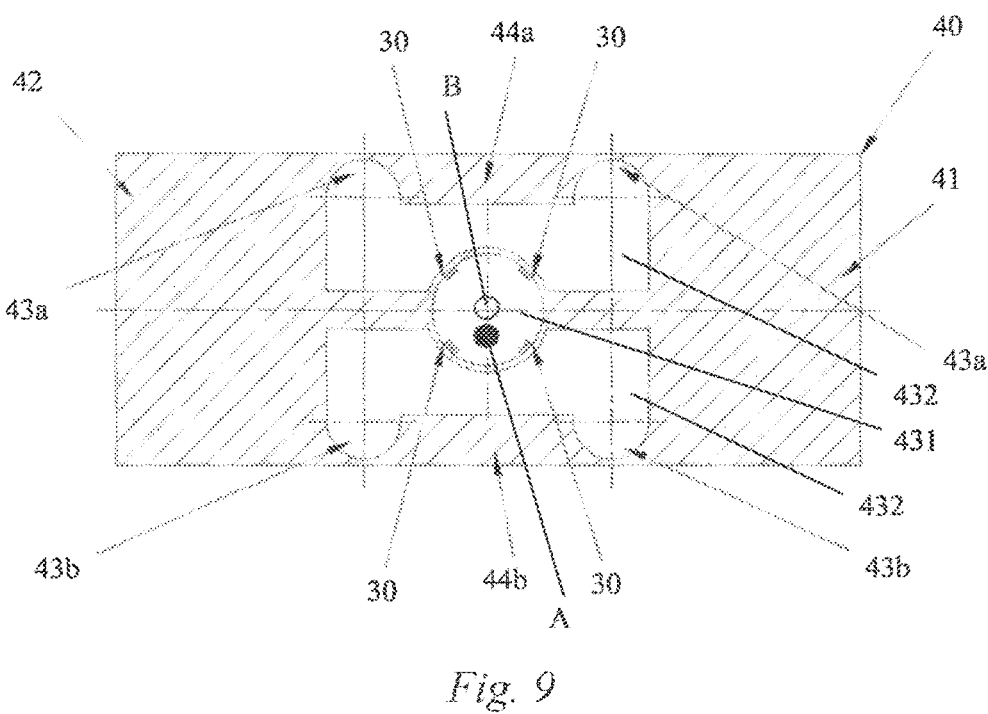
FIG. 9 is a schematic structural diagram of Embodiment 4 of the load cell with the Roberval structure having the anti-offset function according to the present invention.

FIG. 9 is a schematic structural diagram of Embodiment 4 of the load cell with the Roberval structure having the anti-offset function according to the present invention.

As shown in FIG. 9, Embodiment 4 is basically the same as Embodiment 3 in structure, and the differences therebetween lie in that the first strain generation portion 431 is preferably circular, the second strain generation portion 432 is preferably in the shape of the Chinese character "a", and the bottom of the second strain generation portion 432 matches an outer surface of the first strain generation portion 431 in shape. The strain detection elements 30 are respectively arranged inside the first strain generation portion 431 and surround the first strain generation portion 431.

Embodiment 5

Figure 10:
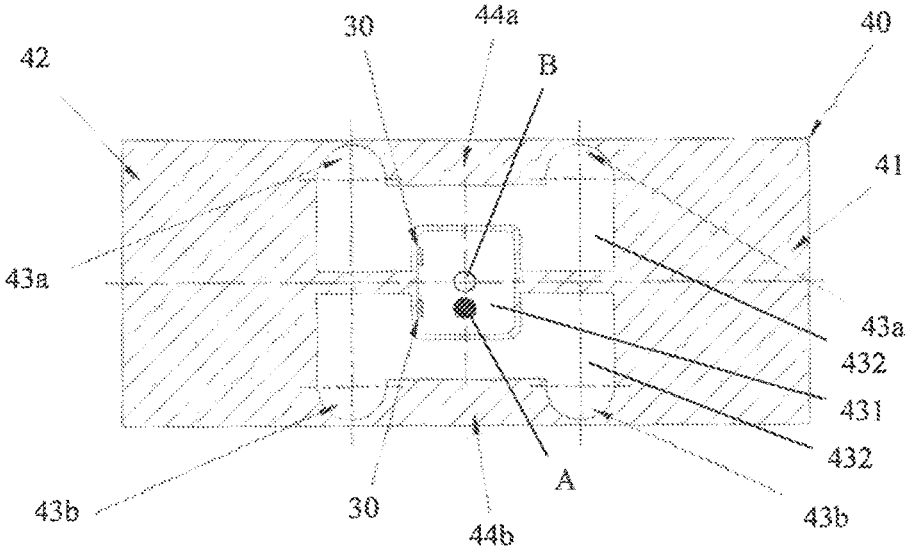
FIG. 10 is a schematic structural diagram of Embodiment 5 of the load cell with the Roberval structure having the anti-offset function according to the present invention.

FIG. 10 is a schematic structural diagram of Embodiment 5 of the load cell with the Roberval structure having the anti-offset function according to the present invention.

As shown in FIG. 10, Embodiment 5 is basically the same as Embodiment 3 in structure, and the differences there between lie in that the first strain generation portion 431 is preferably square or rectangular, the second strain generation portion 432 is preferably in the shape of the Chinese character "a", and the bottom of the second strain generation portion 432 matches an outer surface of the first strain generation portion 431 in shape. The strain detection elements 30 are respectively arranged inside the first strain generation portion 431.

Embodiment 6

Figure 11:
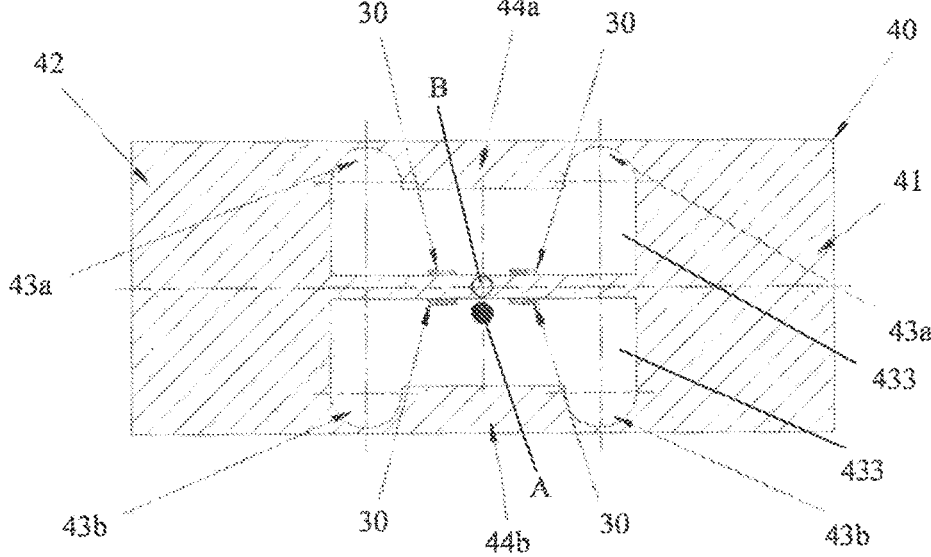
FIG. 11 is a schematic structural diagram of Embodiment 6 of the load cell with the Roberval structure having the anti-offset function according to the present invention.

FIG. 11 is a schematic structural diagram of Embodiment 6 of the load cell with the Roberval structure having the anti-offset function according to the present invention.

As shown in FIG. 11, the present invention discloses a load cell with a Roberval structure having an anti-offset function, the load cell comprising: an elastic element 40 for bearing a load and a plurality of strain detection elements 30 for detecting deformation, the strain detection elements 30 being mounted on the elastic element 40. The elastic element 40 comprises: a loading portion 41, a fixing portion 42, a strain generation portion 43 and a parallel guide beam 44, wherein the loading portion 41 is used for receiving a load from a connector, the fixing portion 42 is used for fixing the elastic element 40, the strain generation portion 43 is used for converting the load into deformation, and the parallel guide beam 44 is used for transferring the load and keeping the loading portion 41 translational when loaded.

The strain generation portion 43 is composed of at least one hollow cavity body, the loading portion 41 and the fixing portion 42 are respectively located on left and right sides of the strain generation portion 43, and the parallel guide beam 44 is located at upper and lower portions of the strain generation portion 43. The centre of rotation A and the geometric centre B of the strain generation portion 43 coincide when the load cell with a Roberval structure is loaded.

Preferably, the strain generation portion 43 comprises two hollow cavity bodies, the two cavity bodies are two third strain generation portions 433 symmetrically distributed vertically, the strain detection elements 30 are respectively disposed inside the third strain generation portions 433, and the strain detection elements 30 correspond to each other vertically. Herein, the third strain generation portion 433 is in the shape of the Chinese character "凹".

Embodiments 3 to 6 described above are variant load cell structures based on the concept of a Roberval structure, in which some substructures are added in a frame of the typical load cell with the Roberval structure in FIG. 2, and the anti-offset performance thereof mainly depends on the design of the Roberval structure, namely, the parallel guide beam 44 and the upper portion 43a and the lower portion 43b of the strain generation portion 43.

Due to the structural design, machining accuracy and mounting method of the elastic element, it is inevitable that the centre of rotation and the geometric centre of each of these variant load cells do not coincide, resulting in that an output signal of the load cell is sensitive to a loading position.

According to the principle of the technical solution of the present application, the position of the centre of rotation of the load cell can be adjusted by adjusting the positions of the upper portion 43a and the lower portion 43b of the strain generation portion 43, or adjusting the thicknesses of the upper beam 44a and the lower beam 44b of the parallel guide beam 44, such that the centre of rotation coincides with the geometric centre, thereby achieving the purpose that the output signal of the load cell is insensitive to the loading position.

According to Embodiments 1 to 6, compensation methods based on the above-mentioned stiffness compensation theory fall within the scope of protection of the present invention, which will not be described in detail herein.

In addition, the present invention further provides a weighing device, comprising the load cell with the Roberval structure having the anti-offset function as described above.

In conclusion, the load cell with the Roberval structure having the anti-offset function and the weighing device of the present invention can effectively compensate the non-linear offset error. By adjusting the stiffness of upper and lower beams of the elastic element, the centre of rotation and the geometry coincide after the centre of the load cell with the Roberval structure is loaded, so that the non-linear offset error is compensated from the aspect of mechanical structure design.

Although specific implementations of the present invention have been described above, those skilled in the art should understand that these are merely examples, and the scope of protection of the present invention is defined by the appended claims. Various alterations or modifications to these implementations can be made by those skilled in the art without departing from the principle and essence of the present invention. However, these alterations and modifications all fall within the scope of protection of the present invention.

REFERENCE SIGNS LIST

Scale pan 10
Elastic element 20, 40
Strain detection element 30
Loading portion 21, 41
Fixing portion 22, 42
Strain generation portion 23, 43
Parallel guide beam 24, 44
Centre of rotation A
Geometric centre B
Upper beam of parallel guide beam 44a
Lower beam of parallel guide beam 44b
Upper portion of strain generation portion 43a
Lower portion of strain generation portion 43b
First strain generation portion 431
Second strain generation portion 432
Third strain generation portion 433

The invention claimed is:
1. A load cell with a Roberval structure having an anti-offset function, the load cell comprising:
an elastic element for bearing a load; and a plurality of strain detection elements for detecting deformation, the strain detection elements being mounted on the elastic element;

wherein the elastic element comprises:

a loading portion for receiving a load from a connector, a fixing portion for fixing the elastic element, a strain generation portion for converting the load into deformation, and a parallel guide beam for transferring the load and keeping the loading portion translational when loaded;

wherein the strain generation portion comprises at least one hollow cavity body, the loading portion and the fixing portion are respectively located on left and right sides of the strain generation portion, and the parallel guide beam is located at upper and lower portions of the strain generation portion; and wherein:

the upper portion of the strain generation portion comprises at least two elements which extend parallelly and are biased towards the fixing portion or towards the loading portion; or the lower portion of the strain generation portion comprises at least two elements which extend parallelly and are biased towards the loading portion or towards the fixing portion;

wherein the strain generation portion comprises three hollow cavity bodies, wherein one of the three hollow cavity bodies is a first strain generation portion, the other two cavity bodies are second strain generation portions;

wherein the first strain generation portion is disposed in a middle of the elastic element, and the second strain generation portions are respectively disposed on upper and lower sides of the first strain generation portion;

wherein the first strain generation portion is H-shaped, circular, square, of rectangular, and a centerline of the second strain generation portion is U-shaped;

wherein the strain detection elements are respectively arranged inside the second strain generation portions, and respectively correspond to the positions of the upper and lower portions of the first strain generation portion.

2. A weighing device comprising a load cell with a Roberval structure having an anti-offset function, said load cell comprising:

an elastic element for bearing a load; and a plurality of strain detection elements for detecting deformation, the strain detection elements being mounted on the elastic element;

wherein the elastic element comprises:

a loading portion for receiving a load from a connector, a fixing portion for fixing the elastic element, a strain generation portion for converting the load into deformation, and a parallel guide beam for transferring the load and keeping the loading portion translational when loaded;

wherein the strain generation portion comprises at least one hollow cavity body, the loading portion and the fixing portion are respectively located on left and right sides of the strain generation portion, and the parallel guide beam is located at upper and lower portions of the strain generation portion; and wherein:

the upper portion of the strain generation portion comprises at least two elements which extend parallelly and are biased towards the fixing portion or towards the loading portion; or the lower portion of the strain generation portion comprises at least two elements which extend parallelly and are biased towards the loading portion or towards the fixing portion;

wherein the strain generation portion comprises three hollow cavity bodies, wherein one of the three hollow cavity bodies is a first strain generation portion, the other two cavity bodies are second strain generation portions, the first strain generation portion is disposed in a middle of the elastic element, and the second strain generation portions are respectively disposed on upper and lower sides of the first strain generation portion;

wherein the first strain generation portion is a circular, square, rectangular, or a unitary object having an outline shaped as two pairs of partially combined circles spaced apart from one another by a rectangle which is partially combined with each of the circles, and a centerline of the second strain generation portion is U-shaped;

wherein the strain detection elements are respectively arranged inside the second strain generation portions, and respectively correspond to the positions of the upper and lower portions of the first strain generation portion.

* * * * *